United States Patent [19]

Nally

[11] 4,143,356
[45] Mar. 6, 1979

[54] CHARACTER RECOGNITION APPARATUS

[75] Inventor: Robert B. Nally, Waterloo, Canada

[73] Assignee: NCR Canada Ltd - NCR Canada Ltee, Mississauga, Canada

[21] Appl. No.: 846,877

[22] Filed: Oct. 31, 1977

[51] Int. Cl.² .............................................. G06K 9/18
[52] U.S. Cl. ............................. 340/146.3 C; 235/449
[58] Field of Search ................ 340/146.3 C, 146.3 Z; 235/449, 466, 474, 493

[56] References Cited

U.S. PATENT DOCUMENTS

| 3,535,682 | 10/1970 | Dykaar et al. | 340/146.3 C |
| 3,744,026 | 7/1973 | Wolff | 340/146.3 Z |
| 3,784,792 | 1/1974 | Dobras | 340/146.3 Z |
| 3,879,707 | 4/1975 | Rohrer | 340/146.3 C |

FOREIGN PATENT DOCUMENTS 1023810  3/1966  United Kingdom ............. 340/146.3 C Primary Examiner—Leo H. Boudreau
Attorney, Agent, or Firm—J. T. Cavender; Wilbert Hawk, Jr.; Richard W. Lavin

[57] ABSTRACT

A magnetic character recognition system is disclosed for reading magnetized characters printed on a document such as a check, which system determines the magnitude and position of each of the peaks of an analog waveform representing each character read by a single gap magnetic read head. Means are provided for normalizing the peak amplitude by dividing the amplitude of each succeeding peak value by the amplitude of the first peak value read and generating a digital value representing the ratio of the succeeding peak values to the first value. Further means are provided for normalizing the peak position by determining the ratio of the position of each of the peaks within the waveform to the position of the first position peak of the waveform. The digital values of the normalized peak amplitude and position are then processed and compared with corresponding values of a plurality of reference characters to identify the character read. Threshold values are applied to insure a valid recognition operation.

22 Claims, 19 Drawing Figures

FIG. 2
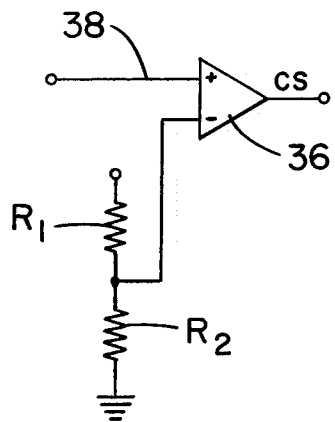
FIG. 3
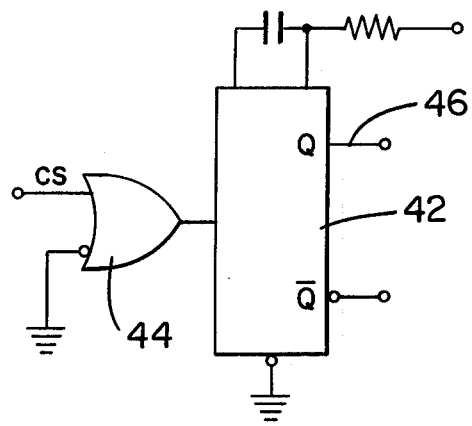
FIG. 4
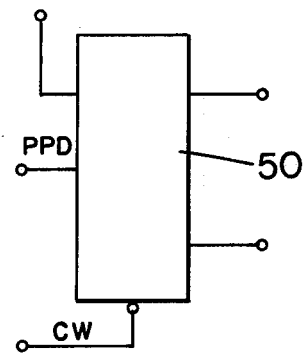
FIG. 13
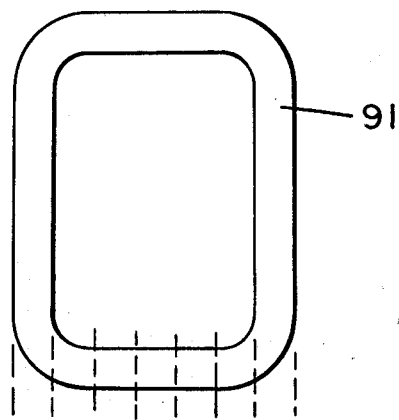
FIG. 13A
FIG. 13B
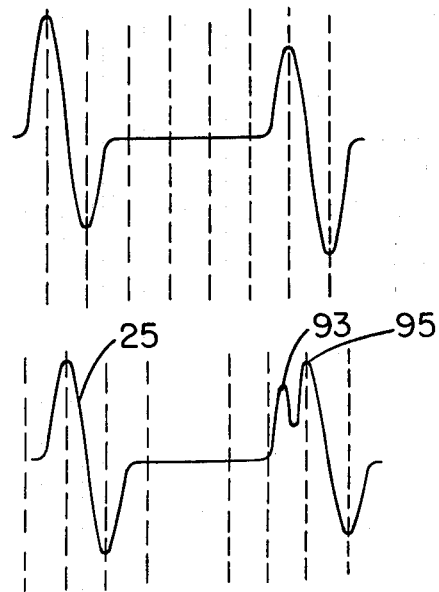

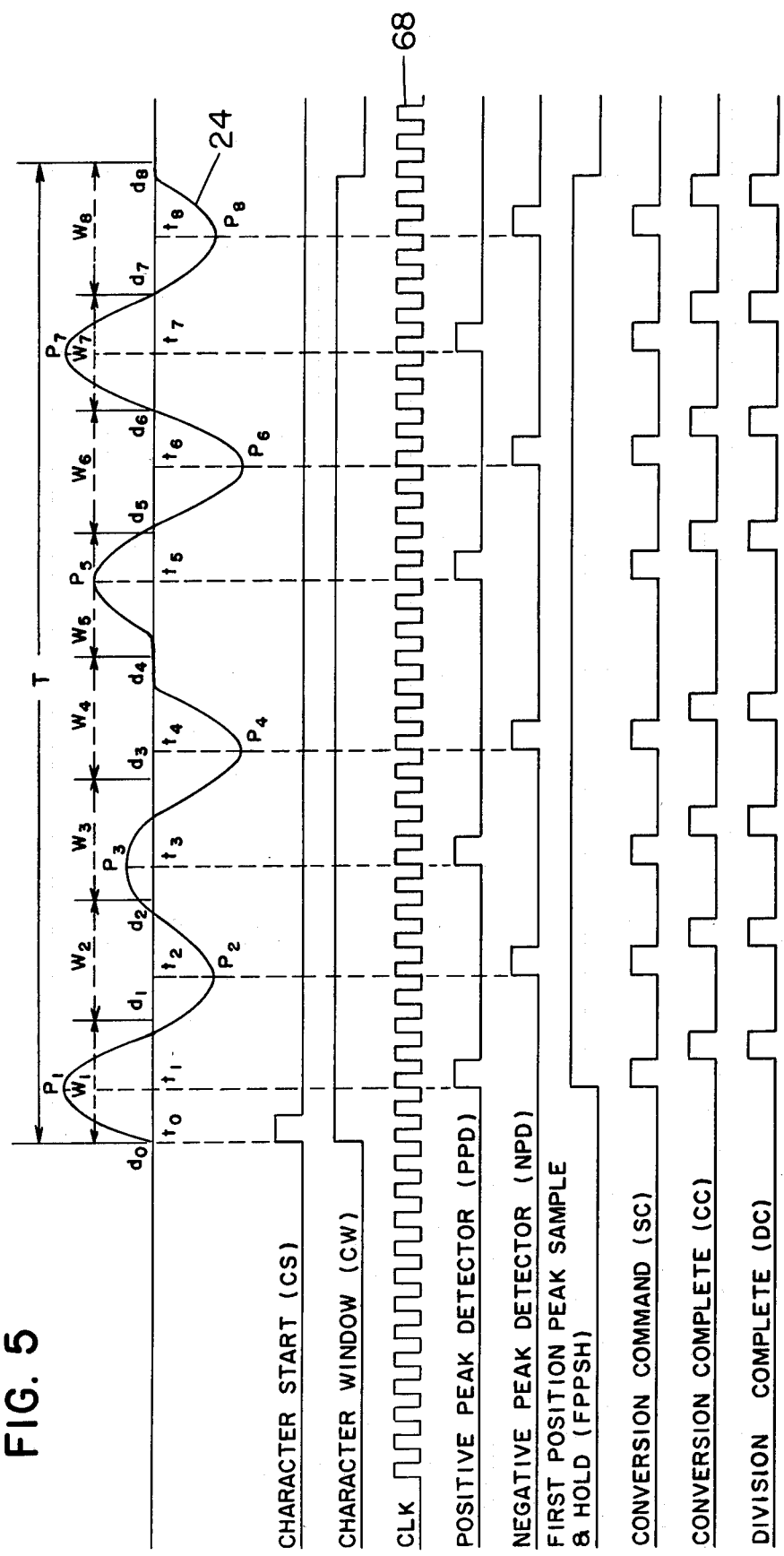

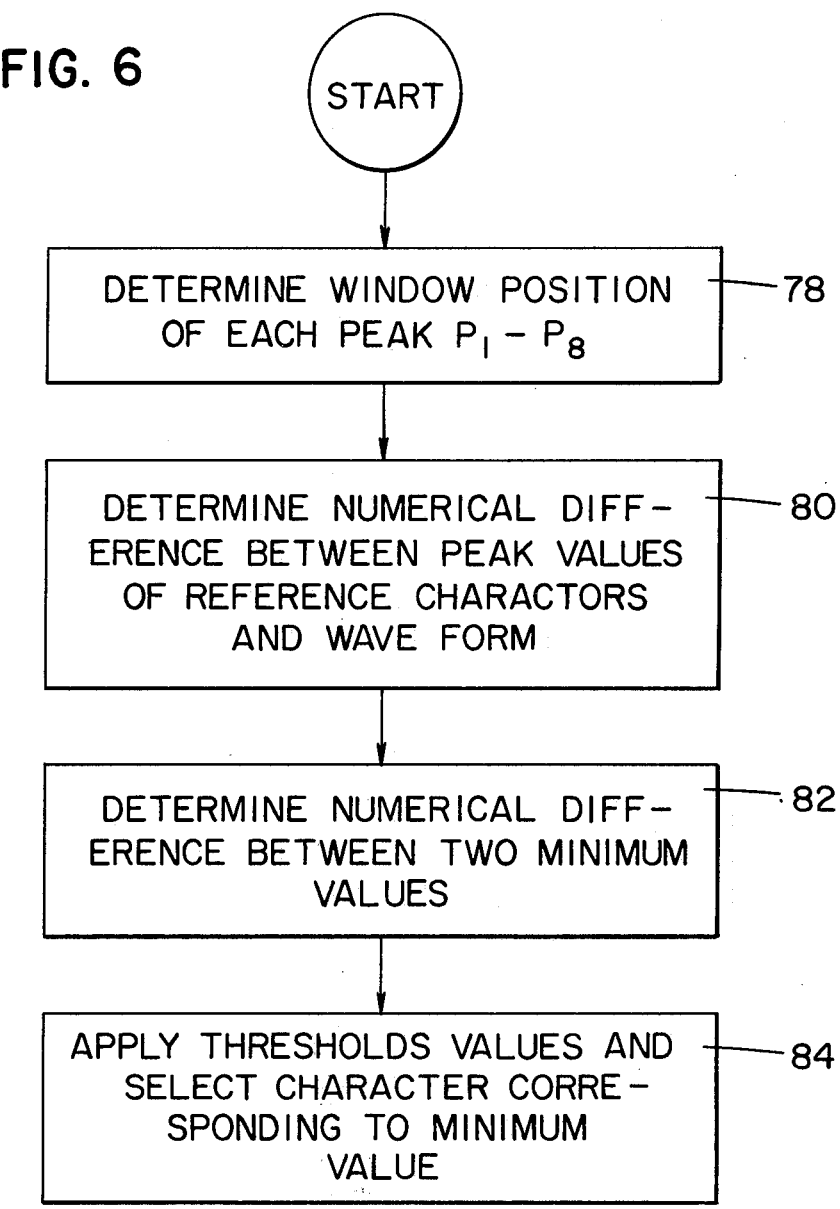

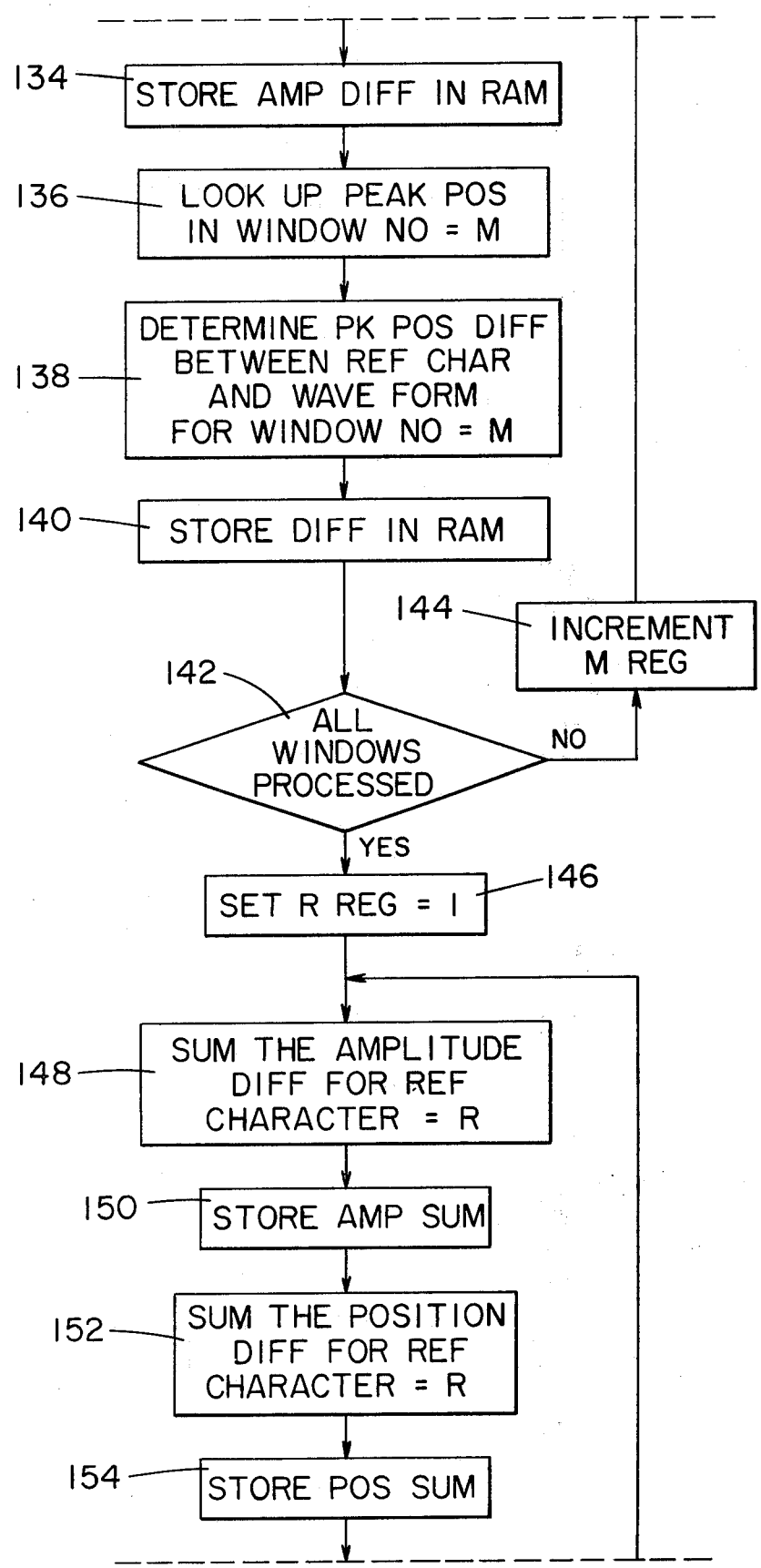

FIG. 8

| PEAK NO | ADDRESS | RATIO CONSTANT |
|---|---|---|
| 1 | 0000 | $P_1/P_1$ |
|   | 0001 | $t_1/t_1$ |
| 2 | 0010 | $P_2/P_1$ |
|   | 0011 | $t_2/t_1$ |
| 3 | 0100 | $P_3/P_1$ |
|   | 0101 | $t_3/t_1$ |
| 8 | 1110 | $P_8/P_1$ |
|   | 1110 | $t_8/t_1$ |

FIG. 9

| WIN NO | WINDOW ADDRESS | FLAG BIT | PEAK NUMBER |
|---|---|---|---|
| 1 | 010000 | 1 | 0001 |
| 2 | 010001 | 1 | 0010 |
| 3 | 010010 | 1 | 0011 |
| 4 | 010011 | 1 | 0100 |
| 5 | 010100 | 1 | 0101 |
| 6 | 010101 | 1 | 0110 |
| 7 | 010110 | 1 | 0111 |
| 8 | 010110 | 1 | 1000 |

FIG. 10

| WIN NO | ADDRESS | ABSOLUTE DIFFERENCE |
|---|---|---|
| 1 | 00011000 | DIFF #1 − NPA ↓ DIFF #14 − NPA |
| 2 | 00011001 | DIFF #1 − NPA ↓ DIFF #14 − NPA |
| 8 | 00011110 | DIFF #1 − NPA ↓ DIFF #14 − NPA |
| 1 | 00011111 | DIFF #1 − NPP ↓ DIFF #14 − NPP |
| 8 | 11110111 | DIFF #1 − NPP ↓ DIFF #14 − NPP |

FIG. 11

| ADDRESS | SUM OF TOTAL DIFFERENCE |
|---|---|
| 011111000 | TDS #1 |
| 001 | TDS #2 |
| 010 | TDS #3 |
| 100000110 | TDS #14 |

CHARACTER RECOGNITION APPARATUS

BACKGROUND OF THE INVENTION

This invention relates to a character recognition system and, more particularly, to a system employing a single-gap magnetic read head for reading magnetized characters embodied in the form of E-13B character font.

In single-gap magnetic character reading systems, a single analog input waveform is obtained by passing the characters to be sensed, normally located on a document, beneath a magnetic read head at least as wide as the height of the characters and having a single flux gap. The signal generated by the read head is a derivative waveform representing the rate of change of magnetic flux traversing the head as the characters are scanned. Since the distribution of ink, and thus flux, associated with each different character is unique, the waveform derived for each different character uniquely identifies that character.

To simplify the timing of the waveform analysis process, the characters are provided with stylized geometric features which impart anticipatable timing characteristics to the derived waveforms. Thus, in accordance with this scheme, for reader identification, each character of the E-13B font is divided into a predetermined number of vertical segments. The characters are designed such that the distribution of ink undergoes significant change only at the boundaries between segments. Hence, peak fluctuations in the derived waveform caused by these variations in ink distribution can occur within predetermined time zones or windows during the character scan.

Prior character recognition systems have incorporated circuits for determining the amplitude of each of the peaks of the waveform which uniquely represents the character read. These peak amplitudes are normalized and then correlated with the known peak characteristics of each of the E-13B characters to identify the character read. An example of this type of recognition system may be found in U.S. Pat. No. 3,851,309. Critical to this type of recognition system is the method of timing the generation of the windows for sampling the waveform to detect the occurrence of each of the peaks in the waveform. In actual practice, it has been found that the characters imprinted on a document may be distorted such that portions of the symbol of character within the symbol outline are not covered with magnetic ink. Such a distortion may occur due to imperfections of the printing device employed to imprint a character on a document. Also, the pigment of the magnetic ink used by the printing device may not have been uniformly dispersed throughout the character outline. Such poorly defined or misprinted characters produce voltage waveforms that may resemble the waveform of a character other than the character that was intended to be printed, thereby causing a misread. Other errors may be introduced by variation of the speed of the document past the read head thereby displacing the position of the peak from that found in the standard character. It has also been found that documents become splattered with ink particles during the printing process which particles cause corresponding spurious signals in the reading head. All of these situations have caused mis-read operations in those recognition systems which are based solely on the correlation of peak amplitudes with a character reference standard.

It is therefore an object of this invention to provide an improved character recognition system which overcomes the above mentioned problems found in the prior art.

It is a further object of this invention to provide a character recognition system which functions independently of the speed of the characters past the read head.

It is a further object of this invention to utilize the maximum amount of information found in the waveform generated by the character that is read.

It is another object of this invention to provide a character recognition system which minimizes the effect of variations in ink intensity found in the characters that are to be read.

It is a still further object of this invention to provide a character recognition system which utilizes a plurality of parameters of the waveforms in determining the character read.

SUMMARY OF THE INVENTION

These and other objects are fulfilled by providing a character recognition system in which the amplitude and position of each peak in an analog waveform representing a character is detected. Each peak amplitude and position is then normalized by dividing each peak amplitude by the first peak amplitude read and each peak position by the first peak position. The digital value representing the ratio of each normalized maximum peak amplitude and its associated normalized peak position are compared with a corresponding predetermined value for each of the reference characters, thereby generating a plurality of values representing the difference between each of the reference character and the character being read. The two minimum values found in the correlation process are then selected and evaluated with a first threshold value to determine if a reference character can be selected given the data generated by the read head. If it is found that the difference between the two minimum values is sufficiently large, the reference character corresponding to the minimum value found in the correlation process is then selected as that character read by the read head. The minimum value of the selected reference character is then compared with a second threshold value to insure that the magnitude of the generated data is sufficient to adequately recognize the character.

BRIEF DESCRIPTION OF THE DRAWINGS

The foregoing and various other objects, advantages, and meritorious features of the present invention will be apparent from the following detailed description and appended claims when read in conjunction with the drawing, wherein like numerals identify corresponding elements.

FIG. 2 is a logic diagram of the Character Start Module of FIG. 1.

FIG. 3 is a logic diagram of the Character Window Generator of FIG. 1.

FIG. 4 is a logic diagram of the First Positive Peak Sample and Hold Control Module of FIG. 1.

FIG. 5 is a diagram illustrating an ideal analog waveform of a character read by the read head together with the various timing pulses generated during the operation of the system.

FIG. 6 is a flowchart of the general overall operation of the recognition system in accordance with the present invention.

FIGS. 7A–7D inclusive are a flowchart of the operation of the recognition system in determining the character read by the read head utilizing the normalized data generated by the system shown in FIG. 1.

FIG. 8 is a table showing the data stored in the RAM storage area of the processor representing the normalized peak positions and amplitudes generated by the system shown in FIG. 1.

FIG. 9 is a table showing the data stored in the RAM storage area of the processor representing the window locations for the input normalize peaks based on their associated normalized peak positions.

FIG. 10 is a table showing the data stored in the RAM storage area of the processor representing the absolute difference between the input data and the reference data.

FIG. 11 is a table showing the data stored in the RAM storage area of the processor representing the numerical differences between the input data and the reference data.

FIG. 13 is a diagram illustrating the ideal (A) and actual (B) analog waveform of the character zero read by the read head showing a multiple peak condition located within a window position.

DESCRIPTION OF THE PREFERRED EMBODIMENT

Figure 1A:
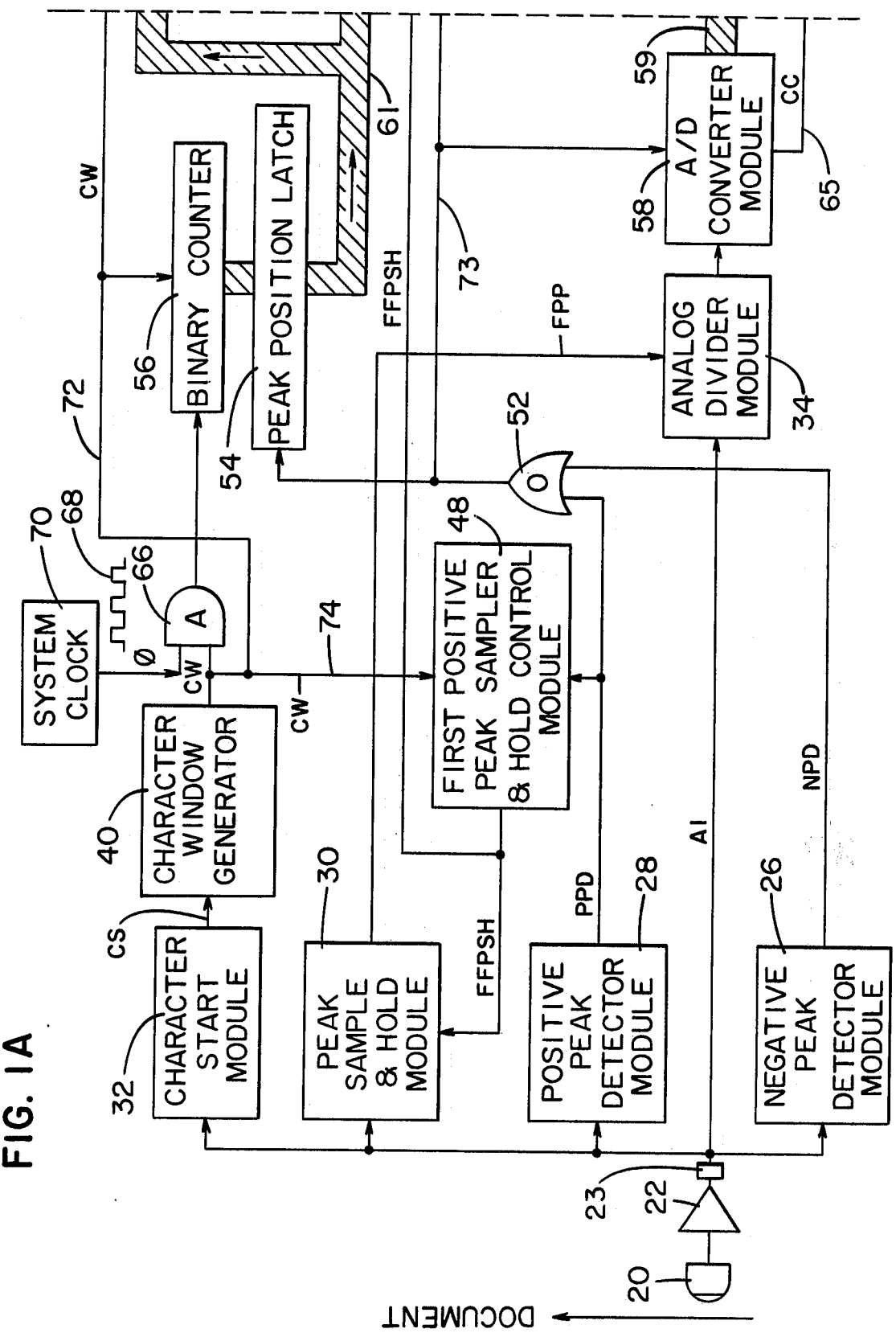
FIGS. 1A and B taken together disclose a block diagram of the character recognition system in accordance with the present invention.
Figure 1B:
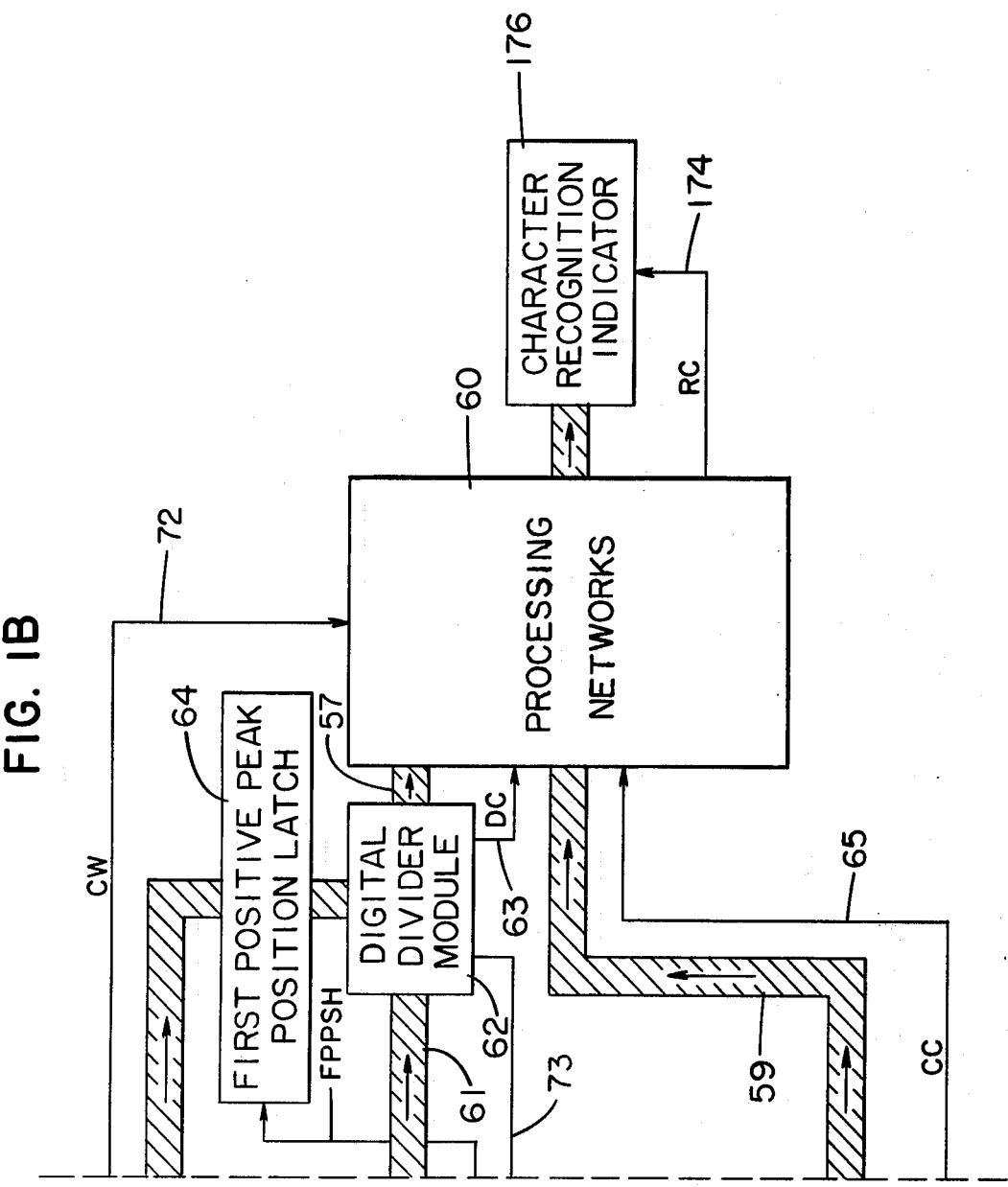

Referring now to FIGS. 1A and 1B, there is shown a block diagram of the character recognition system of the present invention. The system includes a single gap magnetic read head 20 which is positioned adjacent the path of movement of a document having characters printed thereon in magnetic ink. While the characters illustrated in the present embodiment are printed in the form of the E-13B character font which has been adopted by the American Bankers Association for use with banking checks in this country, it is obvious that the recognition system of the present invention can be used with any character font which results in a unique analog waveform when scanned by the read head 20. As the document moves past the read head 20 in the direction indicated by the arrow in FIG. 1A, the read head 20 will generate an analog electrical signal corresponding to the time derivative of the change in flux of the magnetized ink, which signal may be respresented by the ideal analog waveform 24 in FIG. 5 or the actual analog waveform 25 in FIG. 13B. The amplified waveform is transmitted from the amplifier 22 through an analog filter 23 for filtering out noise to a plurality of modules which include a Negative Peak Detector Module 26, (FIG. 1A), a Positive Peak Detector Module 28, a Peak Sample and Hold Module 30, a Character Start Module 32 and an Analog Divider Module 34 which functions, with other elements disclosed in FIG. 1A and 1B, to generate a plurality of digital values representing the ratio of the amplitude and position of each peak in the waveform 24 (FIG. 5) with the amplitude and position of the first positive peak of the waveform 24 respectively.

The Character Start Module 32 (FIG. 1A) is a network which detects the positive going edge of the character waveform after applying a threshold value to the waveform 24 FIG. 5). An example of a circuit which may be utilized for the Character Start module is shown in FIG. 2. Included in the network of the Start module 32 is an analog comparator 36 whose positive input 38 is connected to the filter 23 for receiving the voltage level of the waveform and comparing this level with a threshold level developed from a pair of Resistors $R_1$, $R_2$ connected in series, the comparator 36 outputting a digital pulse CS (FIG. 5) for use in initiating the processing of the character waveform 24.

The Positive Peak Detector Module 28 and the Negative Peak Detector Module 26 are of well-known construction and function to detect the time of occurrence of each of the peaks in the waveform 24 (FIG. 5). An example of a commercially available peak detector that may be used includes a Burr-Brown peak detector 4084/25. The Positive Peak Detector Module 28 will output a control pulse PPD (FIG. 5) upon detecting a positive peak in the waveform 24 while the Negative Peak Detector Module 26 will output a control pulse NPD (FIG. 5) upon detecting a negative peak in a manner well known in the art.

The Peak Sample and Hold Module 30 functions to hold the first peak analog value detected by the Positive Peak Detector Module 28 and retaining this analog value for the time the waveform 24 (FIG. 5) is generated. An example of a commercially available peak sample and hold module is the Burr-Brown Sample and Hold Module SHC 85. The Analog Divider Module 34 is of well known construction which divides one analog value by another analog value. An example of a commercially available divider module is that of Burr-Brown analog divider 4291J.

The output pulse CS from the Character Start Module 32 is transmitted to a Character Window Generator 34 which opens a window (CW) shown in FIG. 5 extending over the length of time T the character waveform 24 is generated by the read head 20. As shown in FIG. 3, the Character Window Generator includes a commercially available 9602 monostable multivibrator 42 whose input signal CS received from the Character Start Module 32 is gated through an OR gate 44 to shift the multivibrator 42 so that the pulse CW (FIG. 2) will appear on the Q output 46 for a predetermined time.

Associated with the Positive Peak Detector Module 28 in a First Positive Peak Sampler and Hold Control Module 48 which receives the first positive output pulse PPD (FIG. 5) from the Peak Detector Module 28 for producing a digital signal FPPSH which causes the Sample and Hold Module 30 to hold the first peak analog value of the waveform 24 (FIG. 5). The Module 30 functions to track the analog waveform 24 (FIG. 5) from the amplifier 22 until it receives the pulse FPPSH from the Module 48 whereupon the Module 30 will retain the voltage it had reached at that time. This voltage which represents the amplitude of the first positive peak is outputted to the Analog Divider Module 34 for use in normalizing each of the peak amplitudes in the waveform 24 (FIG. 5). As shown in FIG. 4, the First Positive Peak Sample and Hold Control Module 48 may comprise a commercially available 7474 flip flop 50 whose input receives the pulse PPD from the Positive Peak Detector Module 28 and which is reset by the pulse CW, generated by the Character Window Generator 40 when the pulse CW times out (FIG. 5) at the end of the generation of the waveform 24.

The output pulse PPD (FIG. 5) from the Positive Peak Detector Module 28 is gated through an OR gate 52 to a Peak Position latch 54 which is connected to a binary counter 56. As will be described more fully hereinafter, the binary counter 56 will count the number of clock pulses it receives from an AND gate 58 whose input is connected to a system clock and to the Character Window Generator 40. The Peak Position latch 54 is also operated by a pulse NPD (FIG. 5) generated by the Negative Peak Detector Module 26 which is transmitted through the OR gate 52 in the same manner as that of the output pulse PPD.

The Analog Divider Module 34 receives the first peak amplitude value FPP from the Peak Sample and Hold Module 30 and the analog waveform 24 (FIG. 5) from the amplifier 22. The Analog Divider Module 34 will divide the amplitude of the waveform 24 by the amplitude of the first position peak thereby producing a normalized value of the waveform 24. The output of the Analog Divider Module 34 is coupled to an Analog to Digital Converter Module 58 which, under the control of the Positive and Negative Peak Detector Modules 26, 28, converts the normalized analog value of the peak amplitude ratio developed in the Analog Divider Module 34 to a digital value which is then outputted over the bus 59 to the system processing network 60 (FIGS. 1B and 12) for use in recognizing the character represented by waveform 24 (FIG. 5) in a manner to be described more fully hereinafter.

The output of the Peak Position latch 54 is transmitted over bus 61 to a Digital Divider Module 62 (FIG. 1B) which is also connected to a First Position latch 64 which, upon receiving the signal FPPSH from the Sample and Hold Control Module 48, will hold the first positive peak position for the total time that the output pulse CW from the Character window Generator 40 is high (FIG. 5). The Digital Divider Module 62 will divide the position of each peak in the waveform 24 by the position of the first peak thereby normalizing each of the peak positions. The output of the Digital Divider Module 62 is transmitted over bus 57 to the system processing network 60 (FIGS. 1B and 12) for use by the character recognition system.

In operation, the Character Start Module 32 upon receiving the analog voltage output from the filter 23 will apply the threshold value to determine if the voltage is sufficiently large to be a character and not some other type of invalid character start voltage. Upon detecting the start of the waveform, the Module 32 will generate the pulse CS (FIGS. 1A and 5) that is transmitted to the Character Window Generator 40. The Generator 40 will output a corresponding pulse CW which, as shown in FIG. 5, goes high for a predetermined duration that is equal to the duration of the waveform 24. The pulse CW will enable an AND gate 66 to output a number of clock pulses 68 (FIG. 5) generated by a clock system 70 which may be of conventional construction and which is inputted to the AND gate 66. The pulse CW also enables, over conductor 72, the binary counter 56 which starts to count the clock pulses 68 (FIG. 1A) received from AND gate 66. The pulse CW also enables the First Positive Peak Sample and Hold Control Module 48 over conductor 74. Upon detecting the first positive peak in the waveform 24 (FIG. 5), the Positive Peak Detector Module 28 will output the control signal PPD to the First Positive Peak Sample and Hold Control Module 48 and the OR gate 52. Upon receiving the control signal PPD from the Module 28, the Control Module 48 will output a digital signal FPPSH which causes the Peak Sample and Hold Module 30 to retain an analog value representing the amplitude of the first peak detected in the waveform transmitted from the amplifier 22. The Peak Sample and Hold Module 30 will retain this analog value of the first peak for the time that the pulse CW is high (FIG. 5).

The control signal PPD generated by the Positive Peak Detector Module 28 is gated through the OR gate 52 to the Peak Position latch 54 thereby latching the output of the binary counter 56 at the time the peak was detected. Thus, the digital value in the Peak Position latch 54 is equal to the position of the first peak in the waveform 24 with respect to the start of the waveform. As shown in FIG. 5, this distance is indicated as $t_1$ and the first peak is indicated as $P_1$. As shown in FIG. 1A and 1B, the signal FPPSH from the Control Module 48 is also outputted to the First Position Peak Position latch 64 which will latch the digital value stored in the Peak Position latch 54 which, as described previously, represents at this time the position $t_1$ (FIG. 5) of the first peak $P_1$ in the waveform 24. Since the pulse FPPSH is high the analog value of the first peak and the digital value of the position of the first peak will be outputted by the Hold Module 30 and the latch 64, respectively, during the time the waveform 24 is generated.

The amplitude waveform 24 (FIG. 5) is also transmitted from the filter 23 to the Analog Divider Module 34 which upon receiving the analog value FPP representing the amplitude of the first peak from the Peak Sample and Hold Module 30 will divide the amplitude of the first positive peak by itself. The result of this division is converted to a digital value by the A/D Converter Module 54 enabled upon the generation of one of the pulse PPD, NPD which is gated through the OR gate 52. The digital value representing the amplitude of the first peak divided by the amplitude of the first peak is transmitted over bus 59 to the system processing networks 60 (FIGS. 1B and 12) for use in the character recognition system.

Figure 12:
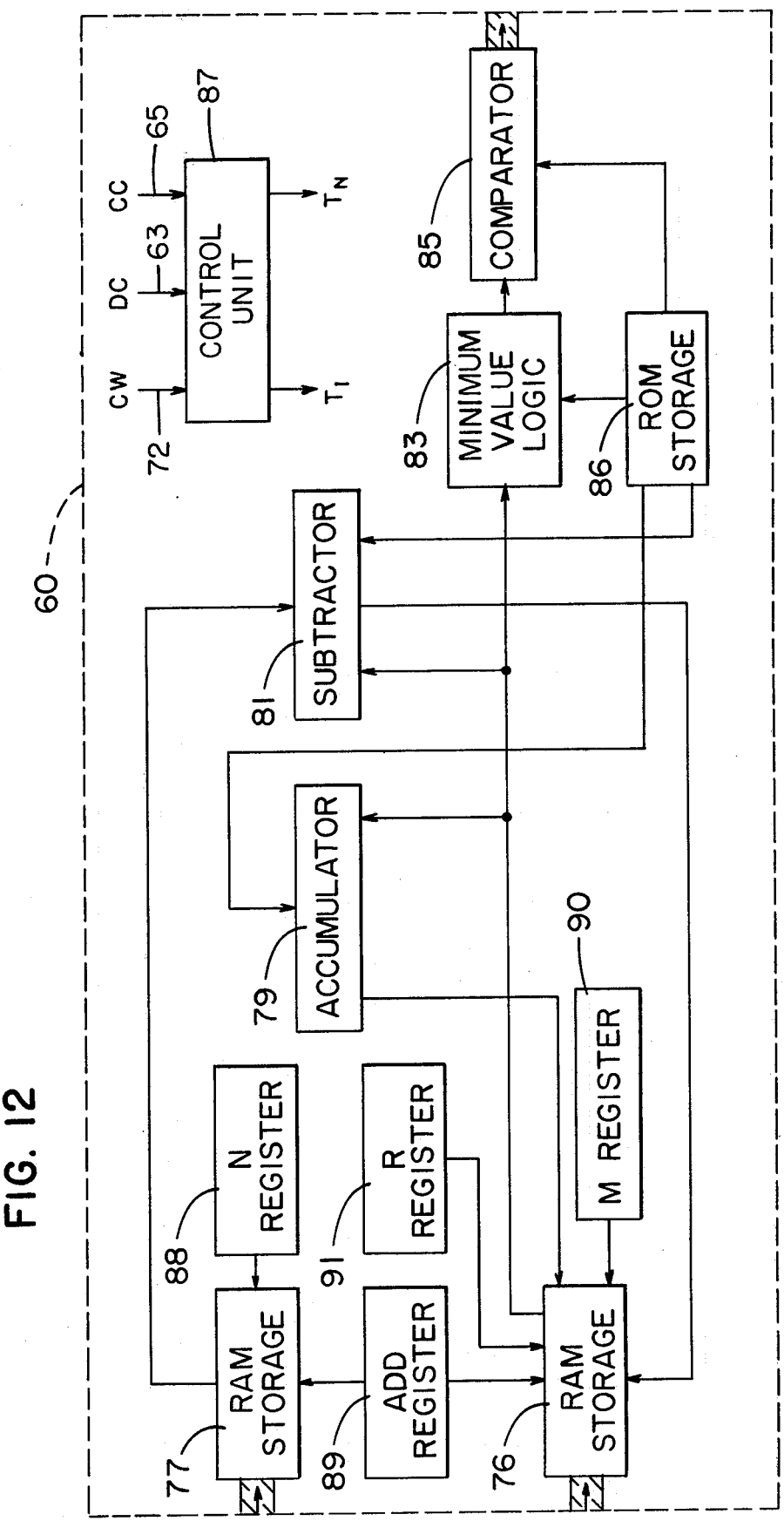
FIG. 12 is a functional block diagram of the processing network shown in FIG. 1B.

The outputting of one of the pulses PPD, NPD from the OR gate 52 to the Peak Position latch 54 and the A/D Converter Module 58 for generating a digital value representing the ratio of the peak amplitude to the first peak amplitude will also cause the Digital Divider Module 62 (FIG. 1B) to divide the position of each peak $P_1$–$P_8$ (FIG. 5) in the waveform 24 is stored in the Peak Position latch 54 by the position of the first positive peak which is stored in the First Positive Peak Position latch 64. The result of this division operation is transmitted, in the form of a digital value, to the processing networks 60 for use in the character recognition system. Upon completion of each division operation by the Digital Divider Module 62, a control signal DC (FIGS. 1B and 5) is transmitted over conductor 63 from the Digital Divider Module 62 to a control unit 87 (FIG. 12) the processing network 60 for storing the result of the division in a RAM storage area 77 (FIG. 12) in a manner that will be described more fully hereinafter. In a similar manner, a control signal CC (FIGS. 1A and 1B) is generated by the A/D Converter Module 58 over conductor 65 to the processing networks 60 upon completion of converting the analog output of the Analog Divider Module 34 to a digital value for storage in the RAM storage area 76 (FIG. 12). This process is repeated for all the positive and negative peaks detected by the Detector Modules 28 and 26, with each of the normalized values of the peak being stored in the RAM storage areas 76 and 77 of the processing networks 60 for use in the character recognition system in a manner that will now be described.

Referring now to FIG. 6, there is shown a general flowchart of the operation of the recognition system in recognizing the character whose waveform 24 (FIG. 5) has been generated by the read head 20 (FIG. 1A). As disclosed above, a digital value representing the normalized peak amplitude of each of the peaks $P_1-P_8$ (FIG. 5) in the ideal waveform 24 has been transmitted over the bus 59 from the A/D Converter Module 58 for storage in the RAM storage area 76 (FIG. 12). Additionally, a digital value representing the normalized peak position has been transmitted to the RAM storage area 77 from the Digital Divider module 62 (FIG. 1B). Utilizing these digital values, the recognition system will first determine (block 78) (FIG. 6) which windows of the waveform 24 the peaks generated by the read head 20 and represented by the normalized peak amplitude and position values should fit into. As is well known in the art, each E-13B character is designed to provide a predetermined number of peaks in the waveform where each peak occurs at a predetermined discreet time. As shown in FIG. 2, each peak, $P_1-P_8$ is shown occurring at a corresponding time $t_1 t_8$ wherein each of the peak occurrences occurs within a corresponding window $w_1-w_8$. As shown in FIG. 13(B), in actual practice, the read head 20, when reading the character zero 91 for example, will generate a waveform 25 in which the peaks are displaced when compared to the ideal waveform (FIG. 13A) due to variations in the speed of the document transport and also may include a number of peaks 93, 95 which fall within a single window. The present system will select the peak 95 having the maximum amplitude as the peak found in the window. Thus (block 78) provides that those peak values which are used in the character recognition system represent the required maximum peak values of the character being read.

After validating the values of the peak positions stored in the RAM storage area 77, the system determines the absolute numerical difference between the input digitial values representing the peaks stored in the RAM storage areas 76 and 77 (FIG. 12) and the corresponding digital values for each of the 14 referenced characters (block 80) stored in a ROM storage area 86. The system will then select the two minimum numerical values found from the 14 referenced characters and determine the difference between them (block 82). This difference is then compared with a minimum value comprising a first threshold to ensure that a valid read operation can be successfully completed. If the two minimum values are so close that it is doubtful that a valid character can be recognized from the signal generated by the read head 20, a reject signal is produced indicating an invalid operation. If the difference between the two minimum values is greater than the threshold value, a character corresponding to that reference character which produced the minimum value is then selected as the character read by the read head 20 (block 84). The minimum value of the selected reference character is then compared and a second threshold value providing the maximum limit of the minimum value that the system will utilize in selecting the reference character.

Referring now to FIGS. 7A–7D, there is shown a more detailed flowchart of the operation of the character recognition system in which the normalized values of the peak amplitude and position are received from the circuit disclosed in FIG. 1A and FIG. 1B, which values are then used in recognizing the character that is read by the read head 20. As shown in FIG. 12, included in the processing networks 60 are the RAM storage areas 76, 77 used for the storage of the input data and the temporary storage of values generated by the recognition system together with an Accumulator module 79 for adding binary numbers, a Subtractor module 81 for subtracting one binary number from another, a Minimum Value Logic network 83 for comparing two binary numbers and outputting the minimum binary number, a Comparator module 85 for outputting a signal indicating the coincidence or lack of coincidence between two binary numbers and a control unit 87 for generating a plurality of timing signal $T_1-T_N$ for operation of the modules shown in FIG. 12 in a manner that is well known in the art in response to receiving the control signals CW over conductor 72 from the Character Window Generator 40 (FIG. 1A), the signal CC over conductor 65 from the A/D Converter Module 58 and the signal DC over conductor 63 from the Digital Divider Module 62 (FIG. 1B). Also included is a ROM storage area 86 in which corresponding values of peak amplitude and position of each peak of the 14 reference characters are stored together with threshold values which are applied to the selected minimum value. Also included in the processing networks 60 are a number of storage registers which include an N register 88, an address register 89, an M register 90 and an R register 91. At the start of a character recognition operation, the system will clear all registers (block 92) (FIG. 7A) and will then check to see if the character window pulse CW (FIGS. 1A, 1B and 5) is high (block 94) indicating that the character waveform 24 (FIG. 5) has been sensed by the read head 20. If the pulse CW is low, the system will wait. When the pulse CW goes high, the system will check (block 96) to see if the analog value of the first peak amplitude has been converted to a digital value. As described earlier, this is accomplished by the generation of the pulse CC (FIGS. 1A and 5) which is transmitted to the control unit 87 (FIG. 12) from the A/D Converter Module 58 (FIG. 1A) signalling that a normalized peak amplitude value has been transmitted over the bus 59 to the RAM storage area 76. The system will then store (block 98) the first normalized peak amplitude value in RAM storage area 76 (FIG. 12) at address 0000 as shown in FIG. 8 which is a table representing a portion of the RAM storage area 76 showing the address and the contents stored at that address. The address of each of the location of the values stored in the RAM storage area 76 is generated from the address register 89 (FIG. 12). After storing the normalized peak amplitude value in the RAM storage area 76 (FIG. 8), the address register 89 is incremented (block 100) and the operation of the Digital Divider module 62 is then checked (block 102) to determine if the digital value of the normalized peak position has been generated. If so generated, a pulse DC (FIGS. 1B and 5) will have been outputted to the control unit 87 over conductor 63 from the Divider module 62. The normalized value of the peak position received over bus 57 from the Digital Divider module 62 is then stored at the address 0001 (FIG. 8) in the RAM storage area 77. The address register 89 is then incremented (block 106) and the character window pulse CW is then checked to see if it is high (block 108). If the pulse CW is still high, the routine is repeated until all of the normalized values of the peak amplitude and position of each peak in the waveform 24 (FIG. 5) are stored in the RAM storage areas 76 and 77.

Figure 7A:
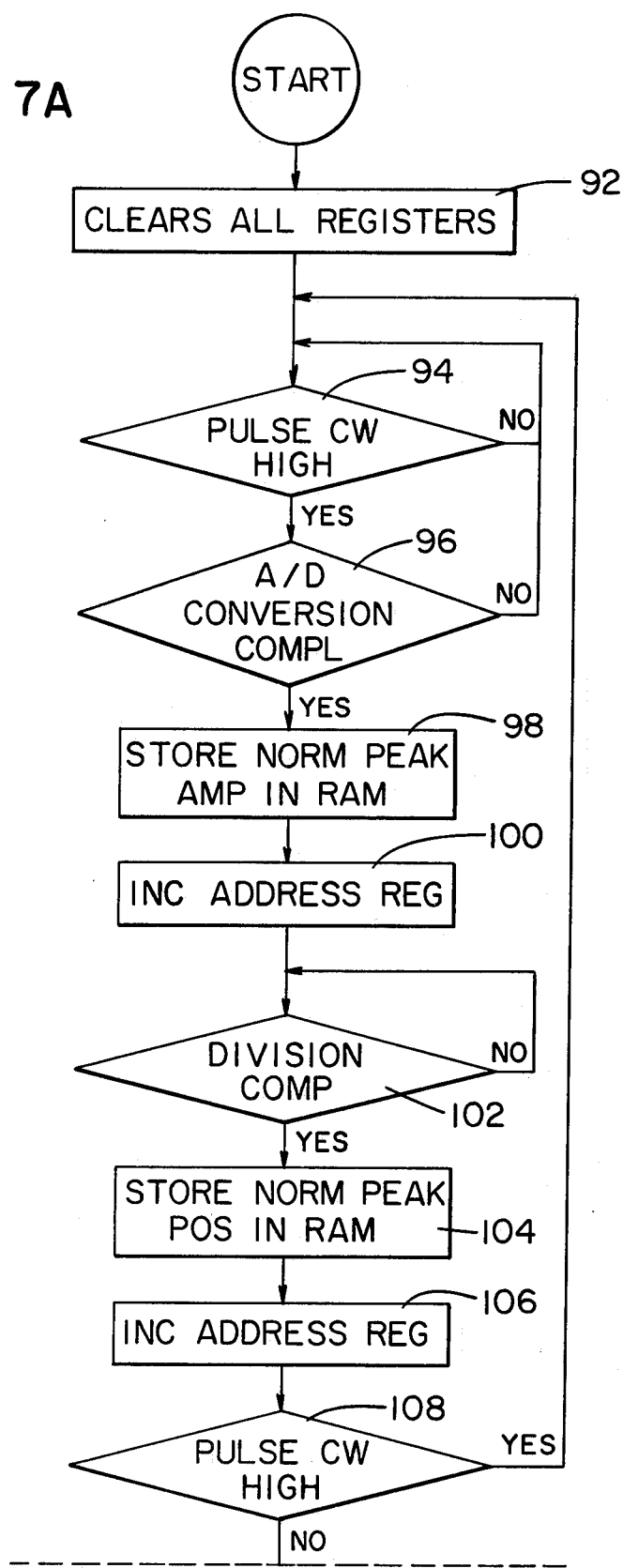
Figure 7B:
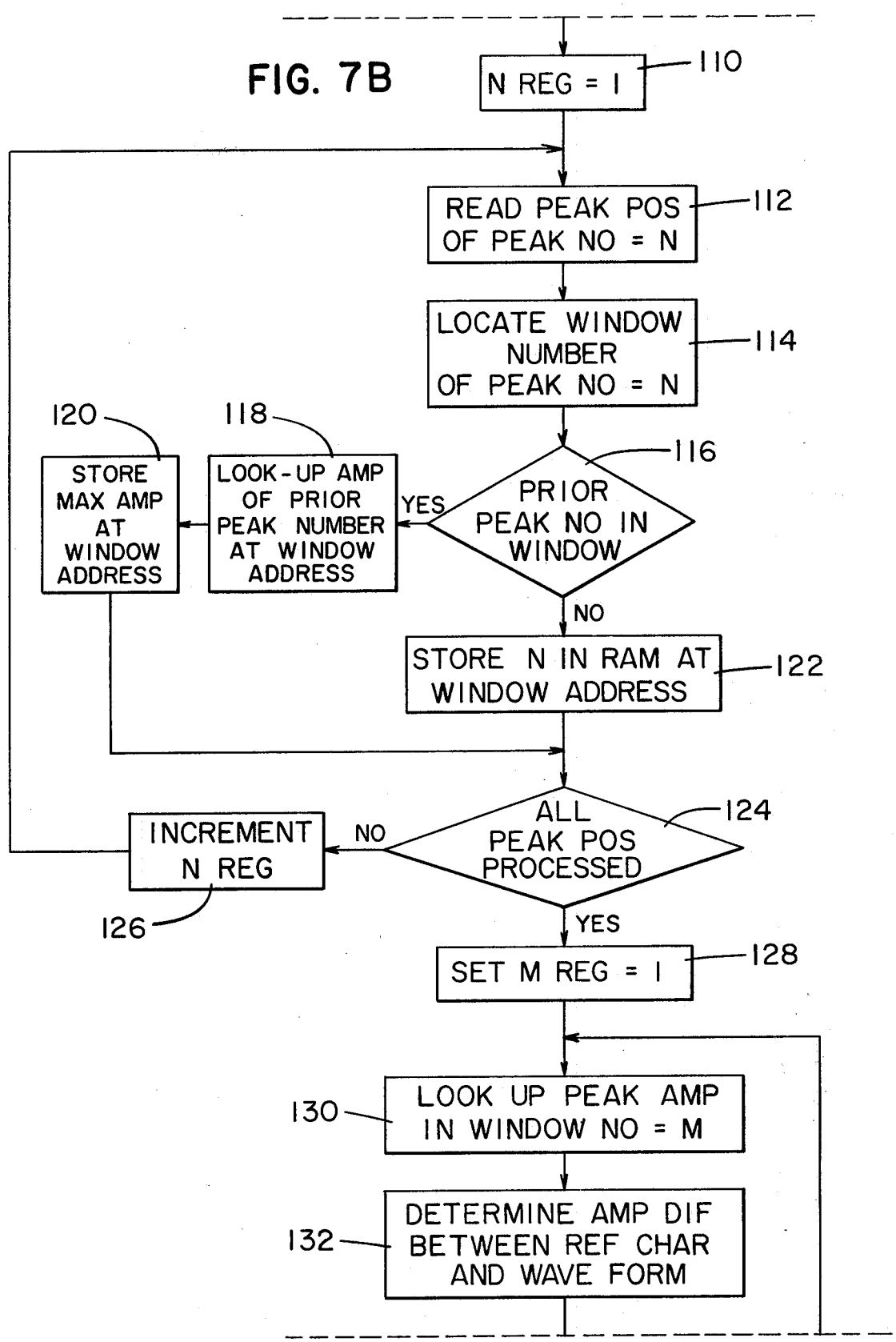
Figure 7D:
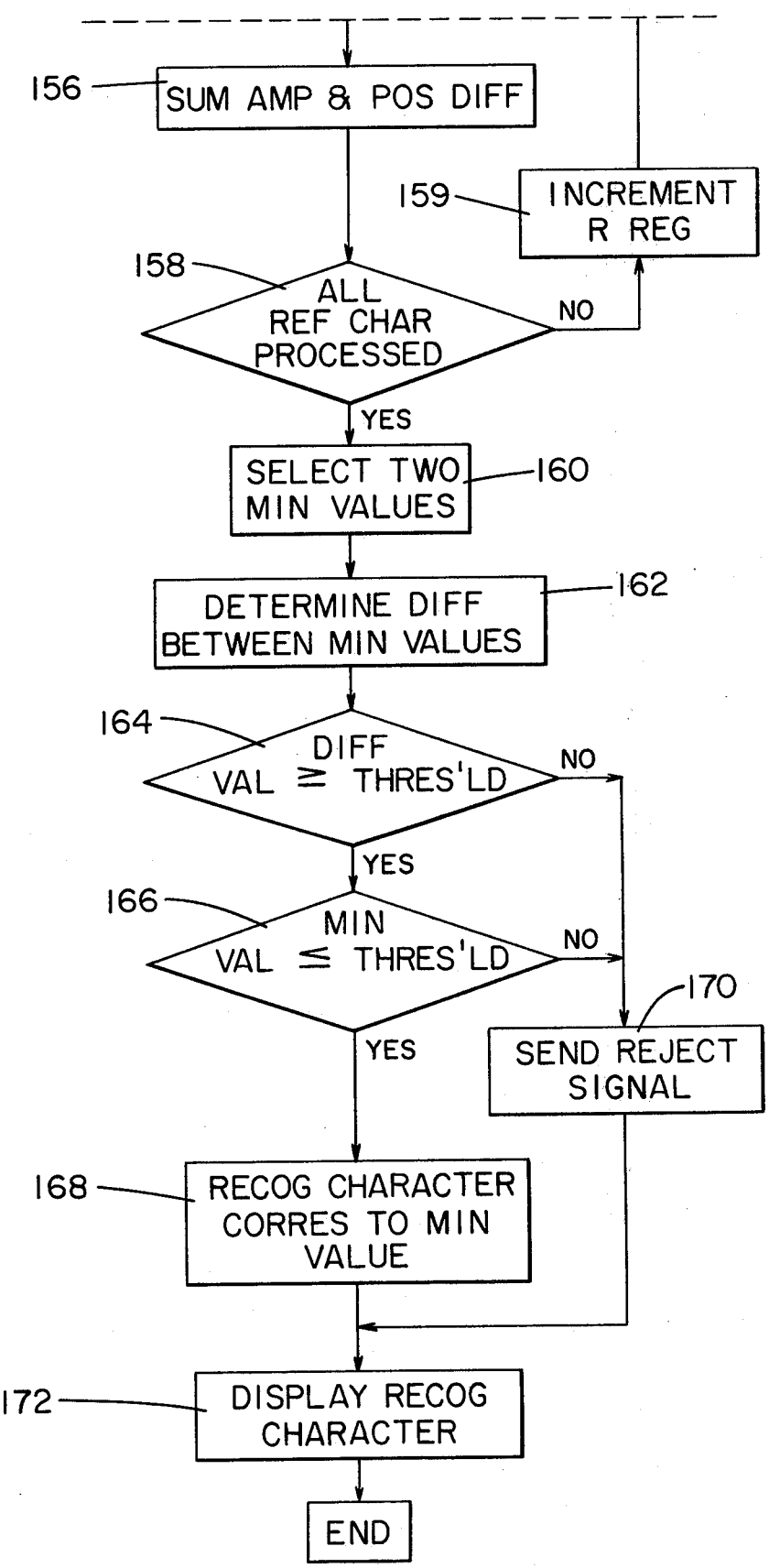

Having received the normalized values of the peak amplitude and position, the system may check to see if the values stored in the storage area 76, 77 represent the maximum peak amplitude in each window. The system will set (block 110) an N register 88 (FIG. 12) to one which register functions to generate a plurality of consecutive numbers N which are used by the system to address (block 112) the RAM storage area 77 containing N normalized peak positions (FIG. 8) to read the position of the peak corresponding to the peak number N. Utilizing each of the normalized peak positions stored in the RAM storage area 77 and knowing the location and width of each of the windows $W_1$-$W_8$ (FIG. 5), stored in the ROM storage area 86 (FIG. 12), the system will locate in each of the eight possible windows, one of the peaks $P_1$-$P_8$ (block 114) (FIG. 7B). The system stores in the RAM storage area 77 (FIG. 12) at each window address location, that peak number $P_1$-$P_8$ found in such window. Referring to FIG. 9, there is shown a table representing that portion of the RAM storage area 77 in which the peaks of the waveform 24 are correlated with the windows that the system found them to be located. Upon inserting a peak number at a corresponding window address, a flag is set to one indicating that the window had already been determined to have a peak located therein. Thus after determining the location of the window in which a peak position is located, the system will check the flag to see if a previously selected peak position was found to fit into this window (block 116). If the flag is zero, the system will store (block 122) the peak number into the storage location (FIG. 9) in the RAM storage area 77 which represents the window number.

If upon checking a window address location in the RAM storage area 77 (FIG. 9) and finding the flag is a one indicating that a peak number has already been found in that window, the system will look up the normalized peak amplitude value of the peak number stored (FIG. 8) at that window address (block 118) in the RAM storage area 76 and then compare the two peak amplitude values. It will then select (block 120) the maximum value of the peak amplitudes compared and store in the RAM storage area 76 (FIG. 9) the value of the maximum peak amplitude at that window address location. The system will then check to determine if all the peak positions have been processed (block 124). This is done by checking the output of the N register 88 (FIG. 12). If all the peak values have not been processed, the N register 88 is incremented (block 126) and the procedure is repeated until all the peak positions or values have been located within an appropriate window.

After determining that all the peak values now stored (FIG. 9) in the RAM storage area 76 and 77 (FIG. 12) represent the maximum peak amplitudes found in the waveform 24 (FIG. 5), the system will now compare each of these peak values with the peak values in each of the 14 reference characters to determine the closest correlation between the character read and the reference characters. As shown in FIG. 12, there is included in the processing networks 60 an M register 90 which generates a plurality of addresses for use in storing the differences between the values of the amplitude and position of each peak found in each window with the value of the amplitude and position of each of the peaks of the 14 character references located in the corresponding window position. After setting the M register at address one (block 128) (FIG. 7B) the system will look up in the RAM storage area 76 the normalized peak amplitude value of the peak that was found in window at address one (block 130), generate a binary number in the Subtractor module 81 (FIG. 12) representing the absolute difference between this amplitude value and the corresponding amplitude value of the peak of each of the 14 reference characters stored in the ROM storage area 86 which is found for this window number (block 132), and then store these 14 differences in another portion of the RAM storage area 76 (block 134). The table seen in FIG. 10 shows the arrangement of the storage of each of the 14 differences found in comparing the normalized peak amplitudes (NPA) and positions (NPP) with the 14 reference characters stored in the ROM storage area 86 relating to the corresponding window number. The system will then look up in that portion (FIG. 8) of the RAM storage area 77 and normalized peak position of the peak that is contained in the window at address one (block 136), generate again in the Subtractor module 81 the absolute difference between the normalized value of the peak position and the peak position in each of the 14 character references corresponding to the window at address one (block 138), and then store these 14 differences (block 140) in that portion (FIG. 10) of the RAM storage area 76 corresponding to the window at address one. The system will then check the M register 90 to determine if all the 8 windows have been processed (block 142). If not, the M address register 90 is incremented by one (block 144) and the procedure is repeated until all the differences between the peak values of each of the 14 reference characters and the waveform 24 (FIG. 5) have been determined for each window and stored in the RAM storage area 76 (FIG. 12).

After determining the absolute numerical differences between the normalized values of the 8 peak amplitudes and positions of the waveform 24 with those of the 14 reference characters (block 80) FIG. 6, the system will now select the two minimum values from the 14 differences and generate a value representing the difference between the two (block 82) in order to determine if the data read by the read head 20 is sufficient to recognize a character from the 14 reference characters. As shown in FIG. 12, the processing networks 60 include an R register 91 which is used to generate a number of addresses corresponding to the reference characters that was compared to the character read by the read head 20. This register is set to one (block 146) (FIG. 7C). The output of the R register 91 is used to address the RAM storage area 76 (FIG. 12) to look up the values stored therein (FIG. 10) representing the difference between the normalized peak amplitude and position of the character read by the read head 20 with the values stored in the ROM storage area 86 of the peak amplitude and position of each of the reference characters corresponding to each of the windows. Using these values, the system will add in the Accumulator module 79 the normalized peak amplitude differences for each of the windows 1-8 for each reference character (block 148) (FIG. 7C), store this sum in the RAM storage area 76 (block 150), add the normalized peak position differences in each of the windows 1-8 for each reference character (block 152) in the accumulator 79, store this latter sum in the RAM storage area 76 (block 154) and then total in the Accumulator module 79 both the sums of the differences of the peak amplitude and positions for each of the windows and store this value in the RAM storage area 76 as shown in FIG. 11. The R register 91 (FIG. 12) is then checked (block 158) to determine if all 14 reference characters have been processed. If not, the R register 91 is incremented (block 159) and the procedure is then repeated until a value representing the total difference between the peak values of the character read by the read head 20 and each of the reference characters has been determined and stored in the RAM storage unit 76 as shown in FIG. 11.

With the total difference between the peak values of the character that is read and each of the 14 reference characters now stored in the RAM storage area 76, (FIG. 11), the next step is to select from the differences associated with each of the 14 reference characters, the two minimum values and then examine these values to see if they meet a pair of threshold requirements for recognition. These threshold requirements determine whether a recognition operation is feasible with respect to the data generated. If the difference between the two minimum values is below a predetermined number, it is assumed that the two reference characters represented by the minimum values are so close that a probability of error exists which would make the recognition of the character unacceptable under the circumstances. If the difference between the two reference characters is greater than this first threshold requirement, the reference character represented by the lowest of the two minimum differences is then selected as the character being read by the read head 20. This selected minimum value is then compared to a second threshold value. If the minimum value selected is greater than this second threshold value, it is doubtful that the data generated is of sufficient magnitude to provide a valid character recognition and therefore the recognition operation is terminated and a signal indicates the status of the operation is generated.

In carrying out this recognition procedure, the system will output to the Minimum Value Logic network 83 (FIG. 12) the values representing the total difference for each of the 14 reference characters stored in the RAM storage area 76. The Minimum Value Logic network 83 may be comprised of a number of 5-bit Comparators which compare two 5-bit words and output a signal indicating which word is less than the other. A commercial example of such a Comparator that may be used is Fairchild Semiconductor Comparator No. 9324. This Comparator when used with the Fairchild Semiconductor 2-input Multiplexer 9322 in the circuit shown on Page 1–7 of the Fairchild Semiconductor TTL Application Handbook published August, 1973, is modified to produce the smallest of the words compared and can select the minimum value of any number of 4-bit words. Another circuit for selecting the two minimum values and applying threshold values to the selected minimum values that may be used is fully disclosed in the co-pending United States patent application of C. Shian entitled "Character Recognition Apparatus," NCR Docket No. 2395. The Minimum Value Logic network 83 will select the two minimum values stored in the table shown in FIG. 11 located in the RAM storage area 76 (block 160), (FIG. 7D) for transmission to the Subtractor module 81, then output from the Subtractor module 81 the absolute difference between the two selected minimum values (block 162), compare in the Comparator module 85 the value of this difference with a predetermined value stored in the ROM storage area 86 which represents a first threshold limit (block 164), and generate a reject signal (block 170) if this absolute difference is less than this threshold value, this signal being generated over line 174 (FIG. 1B) in the form of a pulse RC to a Character Recognition Indicator 176 which will display the reject signal. An example of a commercially available Comparator that may be used includes the previusly cited Fairchild Semiconductor Comparator No. 9324. If the difference generated between the two minimum values (block 162) is equal to or greater than the threshold value (block 164), the minimum value of the two reference characters selected is then compared in the Comparator 85 with a second threshold value (block 166) stored in the ROM storage area 86 (FIG. 12), which value represents the maximum limitation of the minimum value the system will tolerate before indicating a mis-read operation. If this minimum value of the reference character is greater than this second threshold value, again a reject signal is generated (block 170) to the Character Recognition Indicator 176 (FIG. 1B). If the minimum value is equal to or less than this second threshold value, the character that is recognized is that character which corresponds to this minimum value (block 168) and the recognized character is then displayed in the Character Recognition Indicator 176 FIG. 1B (block 172). The recognition process is now complete and the next waveform generated by the read head 20 scanning the document will then be transmitted to the system for the next character recognition operation.

While the preferred embodiment of the invention has been described in detail for recognizing characters in a standard E-13B character font, the character recognition system could be readily adapted by a person of ordinary skill in the art to recognize characters or symbols from any standard character font without departing from the spirit of the invention. Thus while the present embodiment discloses the normalizing of each peak amplitude and position using the first peak amplitude and position, it is obvious that any other peak amplitude and position can be used. Furthermore, many of the changes and details of the preferred embodiment may be made without departing from the spirit or scope of the claim as defined in the appended claims.

That which is claimed is:

1. In a character reading system wherein an analog signal having a waveform unique to each character to be read is generated, said unique waveform including a sequence of varying peak amplitudes and times of occurrence of same corresponding to the shape of the character being read, means for evaluating said waveform to derive signals representing feature characteristics of the character recognized compising:

a. means for detecting said analog peak amplitudes and the times of occurrence thereof;

b. first means responsive to said detected analog peak amplitudes to output a first feature signal representing the ratio of one of said analog peak amplitudes to a predetermined one of said analog peak amplitudes;

c. second means responsive to the detection of the times of occurrence of said analog peak amplitudes to output a second feature signal representing the ratio of the time of occurrence of one of said analog peak amplitudes to the time of occurrence of a predetermined one of said analog peak amplitudes;

d. means for storing first and second features representing corresponding feature characteristics of a plurality of unique reference characters;

e. and means for comparing said first and second feature signals with the reference signals of each unique reference character to produce an output indicating the unique reference character corresponding to the unique waveform.

2. The character reading system of claim 1 wherein said first output means includes an analog divider network for dividing each analog peak amplitude of said unique waveform by a predetermined one of said analog peak amplitudes to output a first feature signal representing the ratio of one of said peak amplitudes to the predetermined one of said peak amplitude.

3. The character reading system of claim 2 further including analog to digital conversion means connected to the output of said analog divider network to convert the first feature signal to a digital value.

4. The character reading system of claim 3 wherein said detecting means includes:
   a. means for generating timing signals responsive to the start of the generation of the waveform;
   b. first means receiving said timing signal to output a first digital value upon the occurrence of each peak amplitude representing the position of said peak amplitude;
   c. second means connected to said first output means to output a second digital value representing the position of a predetermined one of said peak amplitudes;
   d. and said second output means includes a digital divider network for dividing each of said first digital values by said second digital values to output a second feature signal representing the ratio of the position of each peak amplitude to the position of a predetermined one of said peak amplitudes.

5. The character reading system of claim 4 further including means for adding said first and second feature signals of each peak amplitude to output a third feature signal for use in analyzing said waveform.

6. The character reading system of claim 5 wherein said detecting means further includes;
   a. digital counter means for receiving said timing signals to output a count of said timing signals;
   b. said first output means includes a first storage means receiving the output of said counter means and responsive to the detection of each peak amplitude to store a count representing the time of occurrence of each of said peak amplitudes;
   c. and said second output means includes a second storage means receiving the output of said counter means and responsive to the detection of said predetermined one of said peak amplitudes to store a count representing the position of said predetermined one of said peak amplitudes, said digital divider network receiving the output of said first and second storage means and responsive to the dictation of each of said peak amplitudes to output said second feature signal of each peak amplitude.

7. The character reading system of claim 6 in which said detecting means further includes;
   a. peak detector means outputting a signal upon detecting each peak amplitude of said waveform;
   b. and a first peak sample and hold network connected to the output of said peak detector means to output a first control signal during the generation of the waveform upon the occurrence of the first peak amplitude, said digital divider network connected to the output of said sample and hold network to divide said first digital value by said second digital value upon receiving said first control signal.

8. The character reading system of claim 7 in which said detecting means further includes a peak sample and hold network connected to the output of said first peak sample and hold network and responsive to receiving said first control signal to hold the amplitude of the first peak in said waveform, said analog divider network connected to the output of said peak sample and hold network to divide the analog waveform by the amplitude of the first peak.

9. The character reading system of claim 7 in which said detecting means further includes peak detecting means for outputting a second control signal upon detecting each peak amplitude in said waveform, said analog to digital converter conversion means connected to the output of said peak detecting means and responsive to the generation of said second control signal to convert the output of said analog divider network to a digital value upon the occurrence of each peak amplitude.

10. A system for recognizing a unique analog waveform representing one of a plurality of unique reference characters comprising;
   a. means for generating an analog waveform representing an unknown unique character, said waveform having a sequence of varying peak amplitudes and time of occurrence of same corresponding to a unique character;
   b. first means for detecting each analog peak amplitude and time of occurrence of same in said analog waveform;
   c. first means responsive to the detection of each peak amplitude for dividing each peak amplitude by a predetermined one of said peak amplitudes to output a first digital value representing a first feature characteristic of the unique character recognized;
   d. second means responsive to the detection of the time of occurrence of each peak amplitude for dividing the time of occurrence of each peak amplitude by the time of occurrence of a predetermined one of said peak amplitudes to output a second digital value representing a second feature characteristic of the unique character recognized;
   e. means for storing a plurality of reference digital values representing corresponding feature characteristics of a plurality of unique reference characters;
   f. and means for comparing said first and second digital values with the reference values of each unique reference character to produce an output indicating the unique reference character corresponding to the analog waveform.

11. The character recognition system of claim 10 further including second means for detecting the start of the generation of said unique analog waveform and means responsive to the detection of the start of said analog waveform for generating timing signals.

12. The character recognition system of claim 11 in which said first detecting means includes;
   a. peak detector means for outputting a first control signal upon detecting each peak amplitude in said analog waveform;
   b. second means connected to said peak detector means for storing the peak amplitude of a predetermined one of said peak amplitudes;
   c. and said first dividing means includes an analog divider network coupled to said second storing means and said generating means for dividing each peak amplitude by the amplitude of said predetermined peak amplitude to output a plurality of analog values each representing the ratio of one of the peak amplitudes to said predetermined peak amplitude.

13. The character recognition system of claim 12 wherein said second storage means includes a third storage means connected to said peak detector means to output a second control signal upon the occurrence of said predetermined peak amplitude.

14. The character recognition system of claim 13 wherein said third storage means comprises a first positive peak sample and hold network.

15. The character recognition system of claim 12 wherein said second storage means includes a peak sample and hold network.

16. The character recognition system of claim 12 in which said first dividing means further includes an analog to digital conversion network connected to the output of said analog divider network and said peak detector means and responsive to said first control signal to convert the analog output of said first dividing means to a first digital value.

17. The character recognition system of claim 12 in which said first detecting means further includes;
   a. counter means receiving said timing signals and outputting a digital count of said timing signals;
   b. fourth storage means connected to said counter means and said detector means for storing a first digital count representing the position of each peak amplitude in response to the output of said first control signal;
   c. said storage means connected to said counter means and said third storage means and responsive to the outputting of said second control signal to store a second digital count representing the position of the predetermined peak amplitude;
   d. and said second dividing means comprises a digital divider network coupled to said fourth and fifth storage means and responsive to said first control signal for dividing each of said first digital counts by said second digital counts to output said second digital values.

18. The character recognition system of claim 17 in which said comparing means includes;
   a. means for substracting said first and second digital values from the corresponding reference values of each reference character to output a third digital value;
   b. means for adding the third digital values of each reference character to output a fourth digital value representing each reference character;
   c. and means for evaluating each of said fourth digital values to output a signal indicating the reference character corresponding to the minimum fourth digital value.

19. A character reading system comprising:
   a. means for detecting a plurality of analog peak amplitudes and time of occurrence thereof in an analog waveform representing an unknown unique character;
   b. first means responsive to said detected analog peak amplitudes to output a first signal representing the ratio of one of said analog peak amplitudes to a predetermined one of said analog peak amplitudes; second means responsive to the detection of the times of occurrence of said analog peak amplitudes to output a second signal representing the ratio of the time of occurrence of one said peak amplitude to the time of occurrence of a predetermined one of said analog peak amplitudes;
   d. and means utilizing said first and second output signals to identify said unknown unique character.

20. A system for recognizing a unique multi-peak analog waveform representing one of a plurality of unique reference characters comprising:
   a. means for detecting the amplitude and position of each peak in the analog waveform;
   b. means for forming a plurality of first values representing the ratio of the amplitude of each peak in the waveform to the amplitude of a predetermined one of said peaks in the waveform;
   c. means for forming a plurality of second values representing the ratio of the position of each peak in the waveform to the position of a predetermined one of said peaks in the waveform;
   d. means for subtracting the first and second values of each peak from the reference values of a corresponding peak in a plurality of unique reference characters to output a third value;
   e. and means for evaluating the set of third values to output a value representing the unique reference character corresponding to the analog waveform.

21. A system for recognizing a unique multi-peak analog waveform representing one of a plurality of unique reference characters comprising:
   a. means for detecting the amplitude and position of each peak in the analog waveform;
   b. means for forming a plurality of first values representing the ratio of the amplitude of each peak in the waveform to the amplitude of a predetermined one of said peaks in the waveform;
   c. means for forming a plurality of second values representing the ratio of the position of each peak in the waveform to the position of a predetermined one of said peaks in the waveform;
   d. means for storing a plurality of first and second values each representing a feature characteristic of a corresponding peak in a unique reference character;
   e. means for subtracting the first and second values of the analog waveform from each of the corresponding first and second values of the unique reference character to output a plurality of third values for each unique reference character;
   f. means for adding the third values of each unique reference character to output a fourth value;
   g. and means for selecting the unique reference character represented by the minimum fourth value as the character corresponding to the analog waveform.

22. A system for recognizing a unique multi-peak analog waveform representing one of a plurality of unique reference characters comprising;
   a. means for detecting the amplitude of each peak in the analog waveform;
   b. means for detecting the position of each peak in the analog waveform;
   c. means for dividing each peak amplitude by the amplitude of a predetermined one of said peaks in the analog waveform to output a first value;
   d. means for dividing the position of each peak by the position of a predetermined one of said peaks in the analog waveform to output a second value;
   e. means for storing a plurality of first and second values each comprising a feature characteristic of a corresponding peak in the waveform representing a unique reference character;

f. means for subtracting the first and second values of the analog waveform from the corresponding first and second values of each unique reference character to output third and fourth values for each unique reference character;

g. means for adding the third and fourth values of each unique reference character to output a fifth value;

h. and means for selecting the unique reference character represented by the minimum fifth value as the character corresponding to the analog waveform.

* * * * *